United States Patent
Funabashi

(10) Patent No.: US 7,242,005 B2
(45) Date of Patent: Jul. 10, 2007

(54) RADIATION DETECTING CASSETTE AND RADIATION IMAGE DATA MANAGEMENT SYSTEM

(75) Inventor: Takeshi Funabashi, Kaisei-machi (JP)

(73) Assignee: Fujifilm Corporation, Tokyo (JP)

( * ) Notice: Subject to any disclaimer, the term of this patent is extended or adjusted under 35 U.S.C. 154(b) by 113 days.

(21) Appl. No.: 10/689,737

(22) Filed: Oct. 22, 2003

(65) Prior Publication Data
US 2004/0079889 A1   Apr. 29, 2004

(30) Foreign Application Priority Data
Oct. 22, 2002   (JP) ............................. 2002-307068

(51) Int. Cl.
*G01T 1/24*   (2006.01)
(52) U.S. Cl. .............................. 250/370.01; 250/370.09
(58) Field of Classification Search ........... 250/370.09, 250/370.01
See application file for complete search history.

(56) References Cited

U.S. PATENT DOCUMENTS

| 5,661,309 | A | 8/1997 | Jeromin et al. |
| 6,268,614 | B1 | 7/2001 | Imai |
| 6,344,652 | B1 | 2/2002 | Shoji |
| 6,433,341 | B1 * | 8/2002 | Shoji ..................... 250/370.09 |
| 6,806,487 | B2 * | 10/2004 | Tamakoshi et al. ......... 250/586 |
| 2001/0006222 | A1 | 7/2001 | Gebele et al. |

FOREIGN PATENT DOCUMENTS

| EP | 0 603 709 A2 | 6/1994 |
| EP | 1 041 400 A2 | 10/2000 |
| JP | 7-140255 A | 6/1995 |
| JP | 2000-284056 A | 10/2000 |
| WO | WO 95/27221 A1 | 10/1995 |

* cited by examiner

*Primary Examiner*—Constantine Hannaher
(74) *Attorney, Agent, or Firm*—Sughrue Mion, PLLC

(57) ABSTRACT

A workload of a technician (operator) of a radiation image data management system employing a radiation detecting cassette is reduced. An order data reception terminal, a sensor, a transmission means and a reception means is provided within an imaging room. The sensor detects entry of the radiation detecting cassette into an area within a predetermined range of the imaging room. Order data, received from an order data management system, is automatically and wirelessly transmitted to the radiation detecting cassette from the transmission means. After imaging is complete, the order data and an image signal transmitted from the radiation detecting cassette is automatically received by the reception means.

5 Claims, 2 Drawing Sheets

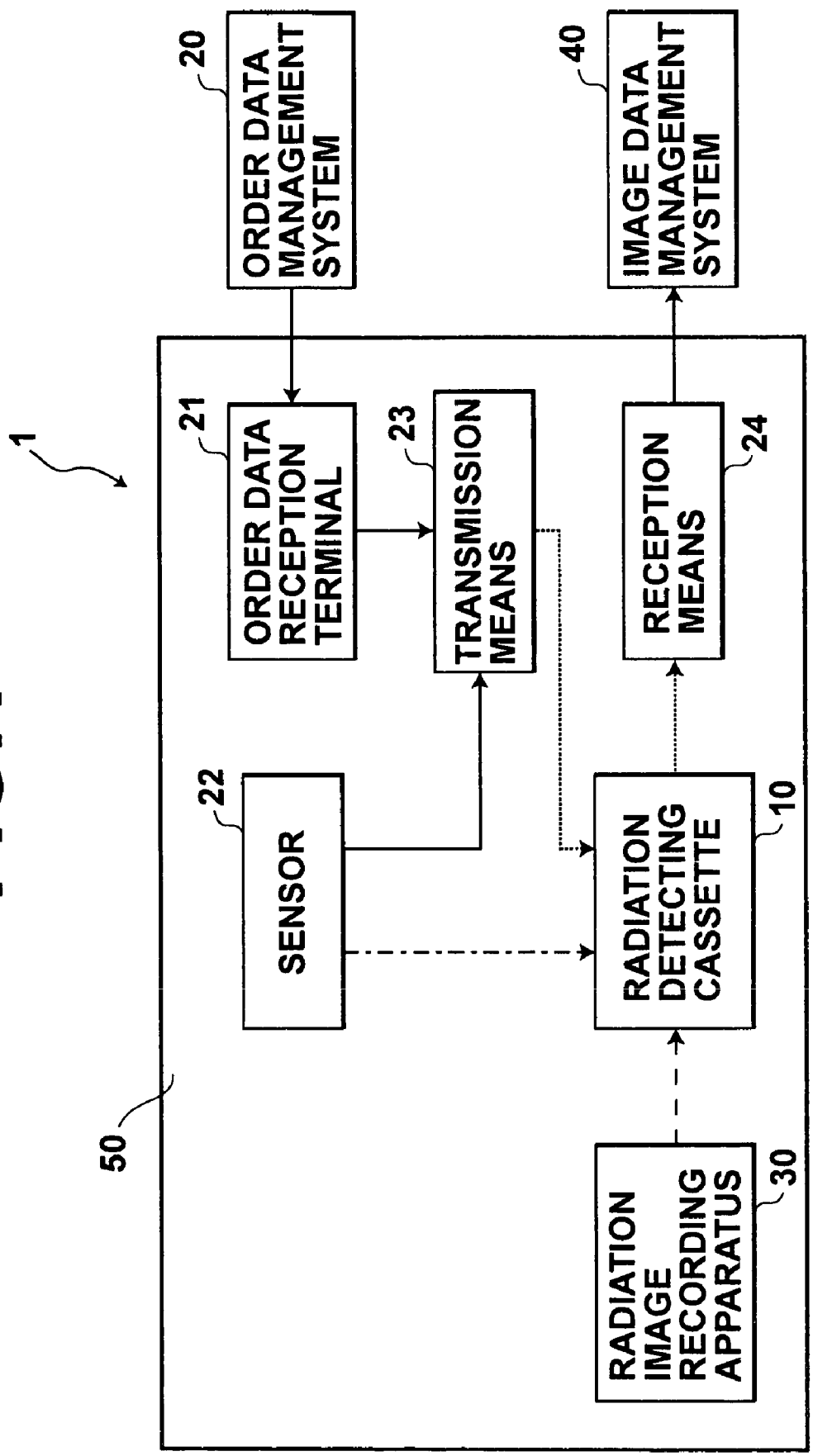

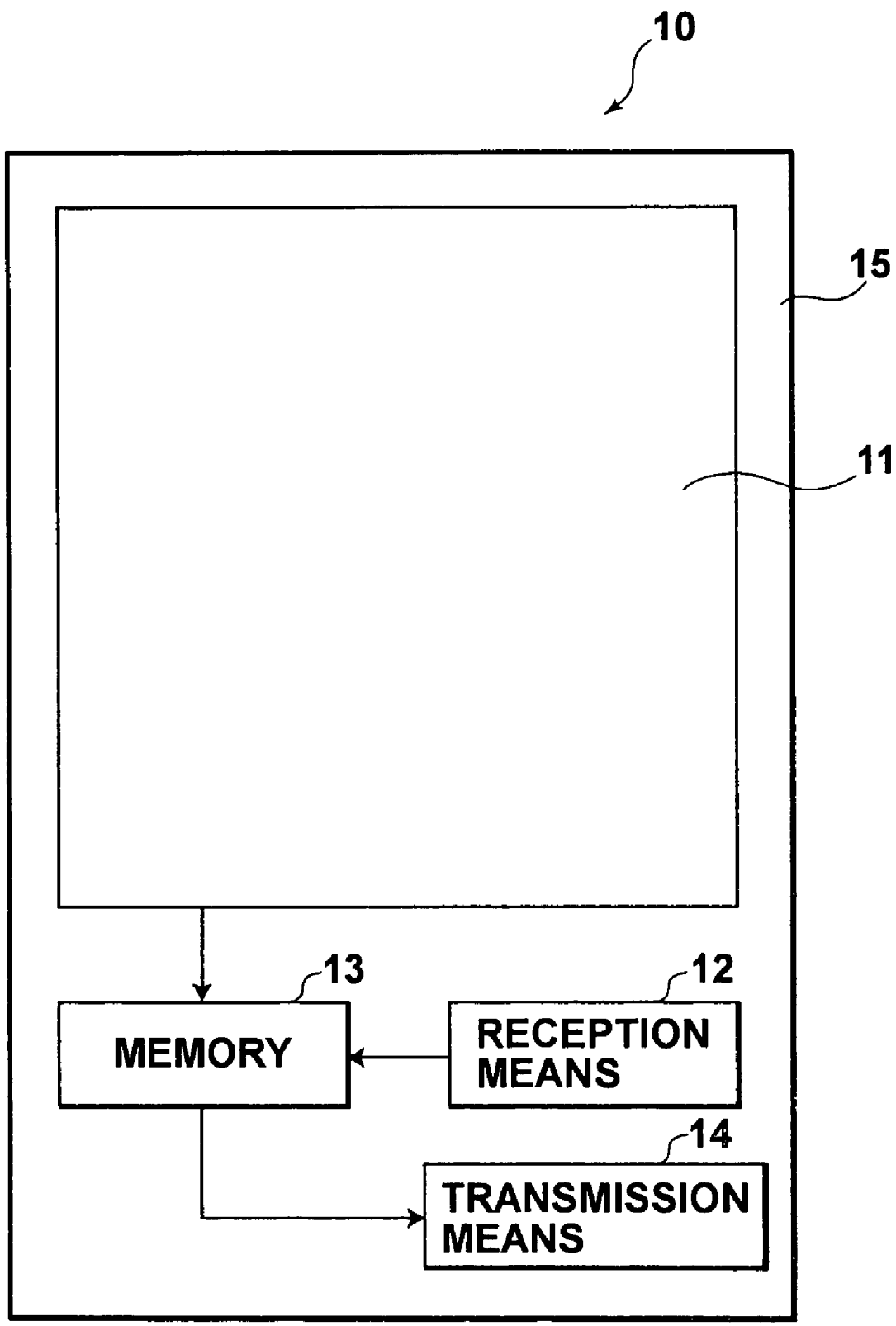

RADIATION DETECTING CASSETTE AND RADIATION IMAGE DATA MANAGEMENT SYSTEM

BACKGROUND OF THE INVENTION

1. Field of the Invention

The present invention relates to a radiation detecting cassette which houses a solid state radiation detector, and a radiation image data management system that employs the radiation detecting cassette.

2. Description of the Related Art

Various types of solid state radiation detectors (having semiconductors as main components) have been proposed and are in use, in the field of radiation imaging for medical diagnosis and the like (refer to, for example, U.S. Pat. No. 6,268,614 and Japanese Unexamined Patent Publication No. 2000-284056). The solid state radiation detectors detect radiation which has passed through a subject, and output image signals representing a radiation image of the subject. There have also been proposed various types of radiation detecting cassettes, which house a solid state radiation detector and an image memory for recording an image signal output from the solid state radiation detector within a case (refer to, for example, U.S. Pat. No. 5,661,309 and Japanese Unexamined Patent Publication No. 7 (1995)-140255).

Recently, image data management systems, which employ radiation detecting cassettes such as those described above, are in use. The image data management systems are particularly employed at large scale hospitals having a plurality of imaging rooms for radiation imaging. The image data management systems make operations of radiation imaging obtaining facilities more efficient, by unitarily managing order data for radiation image obtainment performed within the hospital with a Radiological Information System (RIS) or the like.

As an example of the image data management system, one can be considered which performs the following functions. First, contents of radiation image obtainment to be performed within the hospital (order data for imaging) are registered in the RIS. Then, a radiation detecting cassette is connected to a terminal of the RIS, to record patient data and order data for imaging, such as data regarding a portion to be imaged, in a memory within the radiation detecting cassette. Next, the radiation cassette, having the order data recorded therein, is brought to an imaging room, and imaging of a portion of a subject, according to the order data, is performed. Thereafter, the radiation detecting cassette is loaded into a specialized image readout device, and the order data and the image signal recorded in the memory of the cassette is read out. The order data and the image signal is registered in a medical image data network (PACS: Picture Archiving and Communication System).

In the aforementioned image data management system, a technician who performs imaging is burdened with the following tasks. Before imaging, the technician must connect the radiation detecting cassette to the terminal of the RIS to record the order data for imaging in the radiation detecting cassette. The technician then performs imaging on the radiation detecting cassette. Thereafter, the technician must load the radiation detecting cassette into the specialized image readout device to readout the order data and the image signal. Therefore, even though efficient operations of radiation image obtaining facilities within a hospital may be achieved, there is a problem that the workload of the technician becomes great.

SUMMARY OF THE INVENTION

The present invention has been developed in view of the problem described above. It is the object of the present invention to provide a radiation image data management system employing radiation detecting cassettes, wherein a workload of a technician (operator) is reduced.

The radiation detecting cassette according to the present invention comprises:

a solid state radiation detector for detecting radiation bearing image data and outputting an image signal representing a radiation image;

a case for housing the solid state radiation detector;

a reception means for receiving order data for imaging from an external device;

a memory for recording the received order data; and a transmission means for relating the recorded order data and the image signal output from the solid state radiation detector, and transmitting the image signal to the external device.

The "solid state radiation detector" is a detector for detecting radiation bearing image data regarding a subject, and outputting an image signal representing a radiation image of the subject. The solid state radiation detector directly converts radiation incident thereto into electric charges, or after converting the radiation into light. The electric charges are temporarily accumulated in a charge accumulation portion, then output. The output electric charges constitute the image signal representing the radiation image of the subject.

There are various types of solid state radiation detectors. For example, regarding a charge generation process by which radiation is converted to electric charges, there is a light conversion type and a direct conversion type. The light conversion type of solid state radiation detector detects fluorescence emitted from phosphors due to irradiation thereof by radiation. A photoelectric conversion element converts the fluorescence into signal charges, which are temporarily accumulated in a charge accumulating portion of the photoelectric conversion element. The accumulated charges are converted to image signals (electric signals), which are then output. The direct conversion type of solid state radiation detector comprises a radiation conductor, a charge collecting electrode, and a charge accumulating portion. The charge collecting electrode collects signal charges generated within the radiation conductor due to irradiation thereof by radiation. The signal charges are temporarily accumulated in the charge accumulating portion, converted to electric signals, and output. Regarding a charge readout process for outputting accumulated charges, there is a Thin Film Transistor (TFT) readout type and a light readout type. The TFT type scans a TFT, which is connected to the charge accumulation portion to read out the accumulated charges. The light readout type irradiates a readout light (electromagnetic wave for readout) on the solid state radiation detector to read out the accumulated charges. Further, there is an improved direct conversion type of solid state radiation detector, as disclosed in U.S. Pat. No. 6,268,614 and Japanese Unexamined Patent Publication No. 2000-284056. The radiation detecting cassette may house any type of solid state radiation detector therein.

"Relating the recorded order data and the image signal output from the solid state radiation detector, and transmitting the image signal to the external device" is not limited to a case in which the order data itself is related to the image signal and transmitted. Data that specifies the order data may be related to the image signal and transmitted. That is, any method may be employed as long as the order data to which the image signal is correlated can be specified.

The radiation image data management system according to the present invention comprises:

the aforementioned radiation detecting cassette according to the present invention;

an order data management system for managing order data for imaging;

an order data reception terminal for receiving order data from the order data management system;

a sensor for detecting that the radiation detecting cassette has entered an area within a predetermined range of an imaging room where obtainment of a radiation image is performed;

a transmission means for receiving a detection signal from the sensor that the radiation detecting cassette has entered the area within the predetermined range of the imaging room, and transmitting the order data received by the order data reception terminal to the radiation detecting cassette; and a reception means for receiving the related order data and the image signal, transmitted by the transmission means of the radiation detecting cassette, when image obtainment is complete.

The radiation image data management system of the present invention provides the order data reception terminal, the sensor, the transmission means and the reception means within the imaging room (or the vicinity thereof). The sensor detects that the radiation detecting cassette has entered the area within the predetermined range of the imaging room, and the order data, received from the order data management system, is automatically and wirelessly transmitted to the radiation detecting cassette by the transmission means. After imaging is complete, the order data and the image signal are wirelessly transmitted from the radiation detecting cassette, and automatically received by the reception means. Thereby, the workload of a technician is reduced.

According to the radiation image data management system of the present invention employing the radiation detecting cassette of the present invention, recording of the order data in the radiation detecting cassette, and transmission of the order data and the image signal from the radiation detecting cassette after imaging are performed automatically. Therefore, the workload of the technician who performs imaging is significantly reduced.

BRIEF DESCRIPTION OF THE DRAWINGS

FIG. 1 is a block diagram of a radiation image data management system according to an embodiment of the present invention.

FIG. 2 is a block diagram of a radiation detecting cassette according to an embodiment of the present invention, to be employed in the radiation image data management system of FIG. 1.

DESCRIPTION OF THE PREFERRED EMBODIMENTS

Hereinafter, an embodiment of the present invention will be described in detail with reference to the attached drawings. FIG. 1 is a block diagram of a radiation image data management system according to an embodiment of the present invention. FIG. 2 is a block diagram of a radiation detecting cassette according to an embodiment of the present invention, to be employed in the radiation image data management system of FIG. 1.

The radiation image data management system 1 comprises:

a radiation detecting cassette 10; an order data management system 20 for managing imaging schedules and the like; an order data reception terminal 21 for receiving order data from the order data management system 20; a sensor 22 for detecting that the radiation detecting cassette 10 has entered an area within a predetermined range of an imaging room 50, to be described later; a transmission means 23 for receiving a detection signal from the sensor 22 that the radiation detecting cassette 10 has entered the area within the predetermined range of the imaging room 50, and transmitting the order data received by the order data reception terminal 21 to the radiation detecting cassette 10; and a reception means 24 for receiving the related order data and an image signal, transmitted by the radiation detecting cassette 10, when image obtainment is complete.

Of the above listed components of the radiation image data management system 1, the order data reception terminal 21, the sensor 22, the transmission means 23 and the reception means 24 are provided within the imaging room 50. A radiation image recording apparatus 30 is also provided within the imaging room. The present radiation image data management system 1 may comprise a plurality of imaging rooms having the above components provided therein.

The radiation detecting cassette 10 comprises: a solid state radiation detector 11 for detecting radiation bearing image data and outputting an image signal representing a radiation image; a reception means 12 for receiving order data for imaging from the transmission means 23 of the radiation image data management system 1; a memory 13 for recording the order data received by the reception means 12 and the image signal output from the solid state radiation detector 11; and a transmission means 14 for relating the order data recorded in the memory 13 and the image signal output from the solid state radiation detector 11, and transmitting the image signal to an external device, all housed within a case 15.

The transmission means 23 of the radiation image data management system 1 and the reception means 12 of the radiation detecting cassette 10 perform wireless communication with each other, and are each provided with processing circuits, an antenna, and the like (not shown). The method of wireless communication is not particularly limited. For example, a wireless LAN or Bluetooth protocol may be employed.

Similarly, the reception means 24 of the radiation image data management system 1 and the transmission means 13 of the radiation detecting cassette 10 perform wireless communication with each other, and are each provided with processing circuits, an antenna, and the like (not shown). The method of wireless communication is not particularly limited. For example, a wireless LAN or Bluetooth protocol may be employed.

The order data management system 20 comprises an input terminal for inputting order data and a server or the like for managing and storing the input order data. The aforementioned RIS may be employed for this purpose. Here, the order data refers to data regarding a subject, a portion of the subject to be imaged, and the like.

The sensor 22 comprises a gate type sensor and a tag. The gate type sensor is provided in the vicinity of a door of the imaging room 50. The tag is mounted on the radiation detecting cassette 10. The gate type sensor is configured to detect when the radiation detecting cassette 10 having the tag mounted thereon passes through the gate type sensor, that is, when the radiation detecting cassette 10 enters or leaves the imaging room 50.

The radiation image recording apparatus 30 comprises a radiation source for emitting radiation and a holding portion for holding the radiation detecting cassette 10. The holding portion is provided at a position that faces the radiation source.

Next, the operation of the radiation image data management system 1 will be described.

When order data is input to the order data management system 20, the order data management system selects which imaging room that imaging will be performed in, based on the input order data, and transmits the order data to the order data reception terminal 21 of the selected imaging room 50.

Then, the radiation detecting cassette 10 is brought into the imaging room 50 by a technician who is to perform radiation image obtainment.

The sensor 22 within the imaging room 50 detects entry of the radiation detecting cassette 10 into the imaging room 50, and outputs a signal notifying detection to the transmission means 23.

When the transmission means 23 receives the notification signal from the sensor 22, it obtains the order data from the order data reception terminal 21, and transmits the order data to the radiation detecting cassette 10.

The order data, received by the reception means 12 within the radiation detecting cassette 10, is recorded in the memory 13.

After the above processes are completed, the technician sets the radiation detecting cassette 10 into the radiation image recording apparatus 30. The radiation image recording apparatus 30 is driven to emit radiation from the radiation source. The radiation passes through the subject and enters the solid state radiation detector 11 within the radiation detecting cassette 10, thereby recording image data of the subject as a static electricity latent image.

The memory 13 relates an image signal, output from the solid state radiation detector 11 by scanning of a readout light or the like, with the pre-recorded order data, and records the image signal along with the related order data. When recording is complete, the memory 13 outputs the image signal and the order data to the transmission means 14. The transmission means 14 transmits the image signal and the order data related thereto together to the reception means 24.

The reception means 24 outputs the received order data and the image signal to an image data management system 40, such as the aforementioned PACS.

According to the radiation image data management system 1 as described above, the technician who performs imaging need only to bring the radiation detecting cassette 10 into the imaging room 50 and perform imaging. Therefore, compared to conventional systems, the workload of the technician is significantly reduced.

Preferred embodiments of the radiation image data management system and the radiation detecting cassette according to the present invention have been described above. However, the present invention is not limited to the embodiment described above. Various changes and modifications are possible as long as the substance of the invention is not changed.

For example, the timing of the transmission of the order data and the image signal from the radiation detecting cassette 10 is not limited to that described above. The transmission may be performed at any time after imaging is complete. For example, the order data and the image signal may be transmitted when the radiation detecting cassette 10 is taken out from the imaging room 50.

In addition, a display may be provided on the radiation detecting cassette 10, and an LED may be caused to light up when receiving the order data, or when imaging is completed, to indicate that the order data has been received, or that imaging is completed. In this manner, the present state of operations may be displayed.

What is claimed is:

1. A radiation detecting cassette comprising:
    a solid state radiation detector for detecting radiation bearing image data and outputting an image signal representing a radiation image;
    a case for housing the solid state radiation detector;
    a reception means for receiving order data for imaging from an external device:
    a memory for recording the received order data; and
    a transmission means for relating the recorded order data and the image signal output from the solid state radiation detector, and transmitting the image signal to the external device
    wherein the order data comprises data directly regarding the subject or a portion of the subject to be imaged.

2. A radiation image data management system comprising:
    the radiation detecting cassette defined in claim 1;
    an order data management system for managing order data for imaging;
    an order data reception terminal for receiving order data from the order data management system;
    a sensor for detecting that the radiation detecting cassette has entered an area within a predetermined range of an imaging room where obtainment of a radiation image is performed;
    a transmission means for receiving a detection signal from the sensor that the radiation detecting cassette has entered the area within the predetermined range of the imaging room, and transmitting the order data received by the order data reception terminal to the radiation detecting cassette; and
    a reception means for receiving the related order data and the image signal transmitted by the transmission means of the radiation detecting cassette, when image obtainment is complete.

3. A radiation image data management system according to claim 2, wherein the transmission means of the radiation image data management system and the reception means of the radiation detecting cassette perform wireless communication.

4. A radiation image data management system according to claim 2, wherein the reception means and the transmission means of the radiation detecting cassette perform wireless communication.

5. A radiation image data management system according to claim 3, wherein the reception means and the transmission means of the radiation detecting cassette perform wireless communication.

* * * * *